(12) United States Patent
Choi et al.

(10) Patent No.: US 9,254,885 B2
(45) Date of Patent: Feb. 9, 2016

(54) FRAME UNIT FOR BICYCLE AND METHOD OF MANUFACTURING THE SAME

(71) Applicant: Hyundai Motor Company, Seoul (KR)

(72) Inventors: Jungnam Choi, Seongnam-Si (KR); Myungjin Seo, Gyeongsan-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/143,810

(22) Filed: Dec. 30, 2013

(65) Prior Publication Data
US 2015/0048590 A1  Feb. 19, 2015

(30) Foreign Application Priority Data
Aug. 16, 2013  (KR) .................. 10-2013-0097426

(51) Int. Cl.
| | | |
|---|---|---|
| *B62K 19/08* | (2006.01) | |
| *B23P 15/00* | (2006.01) | |
| *B21D 53/86* | (2006.01) | |
| *B62K 19/20* | (2006.01) | |
| *B21D 39/03* | (2006.01) | |
| *B21D 53/16* | (2006.01) | |

(52) U.S. Cl.
CPC ............... *B62K 19/08* (2013.01); *B21D 53/86* (2013.01); *B23P 15/00* (2013.01); *B62K 19/20* (2013.01); *B21D 39/037* (2013.01); *B21D 53/16* (2013.01)

(58) Field of Classification Search
CPC .................................. B62K 19/08; B23P 15/00
USPC ........................................ 280/288.3; 29/897.2
See application file for complete search history.

(56) References Cited

U.S. PATENT DOCUMENTS

| | | | |
|---|---|---|---|
| 5,011,172 A * | 4/1991 | Bellanca et al. ............ | 280/281.1 |
| 5,791,673 A * | 8/1998 | Patterson ................... | 280/281.1 |
| 2009/0165520 A1* | 7/2009 | Koo et al. ....................... | 72/168 |
| 2011/0140391 A1 | 6/2011 | Lane | |

FOREIGN PATENT DOCUMENTS

| | | | |
|---|---|---|---|
| EP | 2602498 A1 * | 6/2013 | |
| JP | 3004828 U | 11/1994 | |
| KR | 10-1116641 B1 | 3/2011 | |

* cited by examiner

*Primary Examiner* — Joseph Rocca
*Assistant Examiner* — Jacob Knutson
(74) *Attorney, Agent, or Firm* — Morgan, Lewis & Bockius LLP (57) ABSTRACT

A frame unit for a bicycle includes: a left frame body in which a part of a head tube, a part of a seat tube, a part of a frame, and a left stay are integrally formed; and a right frame body in which a part of the head tube, a part of the seat tube, a part of the frame, and a right stay are integrally formed, in which the left frame body and the right frame body are coupled so as to integrally form the head tube, the seat tube, and the frame, and a support ring is installed to the head tube.

6 Claims, 6 Drawing Sheets

FRAME UNIT FOR BICYCLE AND METHOD OF MANUFACTURING THE SAME

CROSS-REFERENCE TO RELATED APPLICATION

The present application claims priority of Korean Patent Application Number 10-2013-0097426 filed Aug. 16, 2013, the entire contents of which application is incorporated herein for all purposes by this reference.

BACKGROUND OF INVENTION

1. Field of Invention

The present invention relates to a frame unit for a bicycle and a method of manufacturing the same, and more particularly, to a frame unit for a bicycle which includes a head tube, a seat tube, a frame, and left and right stays and a method of manufacturing the same.

2. Description of Related Art

In general, a frame unit for a bicycle is a constituent component that forms an overall structure of a bicycle, and manufactured by mutually joining constituent components such as a head tube, a seat tube, a frame, and left and right stays.

Regarding the frame unit for a bicycle, allowing flexibility to provide various designs and secure rigidity for safety are core factors, and to this end, the respective manufacturers actively conduct researches on development of technologies, process methods, materials, and the like.

Recently, in order to implement various designs and secure rigidity for safety, materials such as aluminum, chromium-molybdenum steel, carbon, and titanium are used instead of a high tensile steel material that is generally used.

Figure 1:
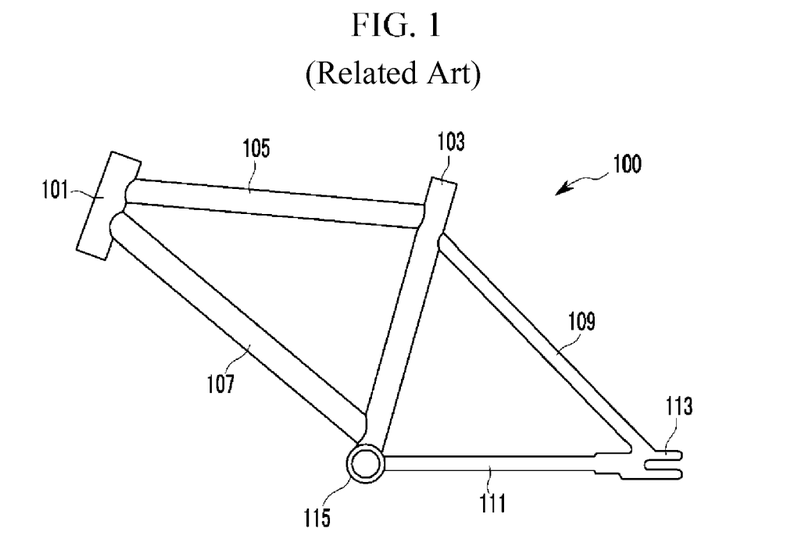
FIG. 1 is a configuration diagram of a frame unit for a bicycle according to the related art.

FIG. 1 is a configuration diagram of a frame unit for a bicycle according to the related art.

Referring to FIG. 1, a frame unit 100 for a bicycle of the related art includes a head tube 101, a seat tube 103, an upper frame 105, a lower frame 107, and upper and lower stays 109 and 111 disposed at both sides.

A steering shaft (not illustrated) to which a steering handle is connected is installed on the head tube 101, and a seat pipe (not illustrated) connected to a seat is installed on the seat tube 103.

The upper and lower frames 105 and 107 connect and support the head tube 101 and the seat tube 103.

Rear ends of both the upper and lower stays 109 and 111 are connected to each other so as to form a rotating body fork 113 to which a rear wheel is mounted.

A front end of the lower stay 111 is connected to a pedal assembly 115 that is configured at a lower end of the seat tube 103.

Meanwhile, the frame unit 100 for a bicycle mostly includes both the upper frame 105 and the lower frame 107, but in some cases, only a single frame, that is, only the upper frame 105 may be applied between the head tube 101 and the seat tube 103.

However, according to the frame unit 100 for a bicycle of the related art, which has the aforementioned configuration, when the head tube 101, the seat tube 103, the upper frame 105, the lower frame 107, and the upper and lower stays 109 and 111 are joined to each other by a welding process, residual stress due to welding heat is distributed to joining portions. Particularly, impact loads are directly applied when the bicycle runs, thereby causing a serious problem with respect to safety such as cracks or damage occurring at the periphery of the joining portions.

Particularly, because welding work is performed after the head tube 101 passes through a separate preheating process in accordance with a difference in thickness between the upper and lower frames 105 and 107 when the head tube 101 is joined to the upper and lower frames 105 and 107, there is a drawback in that a welding defect occurs if the preheating process is not properly performed.

In addition, since the process of welding the joining portions is manually performed, an inferiority rate is high because there is a difference in welding quality in accordance with skill of workers and working environment, and thereby, there are drawbacks in that an excessive working time is required and productivity deteriorates.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention provide for a frame unit for a bicycle including: a left frame body in which a part of a head tube, a part of a seat tube, a part of a frame, and a left stay are integrally formed; and a right frame body in which a part of the head tube, a part of the seat tube, a part of the frame, and a right stay are integrally formed, in which the left frame body and the right frame body are coupled so as to integrally form the head tube, the seat tube, and the frame, and a support ring is installed to the head tube.

The support ring may have one end formed to be bent outward so as to form a coupling groove into which an end portion of the head tube is fitted.

The support ring may have the other end formed to be inclined outward so as to form a guide end.

The support ring may be processed in a ring shape by press-forming and rolling a metal plate.

The support ring may have a protrusion which is formed on one end thereof, and a groove which is formed in the other end thereof and into which the protrusion is inserted, and the support ring may be processed in a ring shape by coupling the protrusion and the groove.

The support rings may be coupled to an upper end and a lower end of the head tube, respectively.

The support ring may have the same thickness as the head tube.

The left frame body and the right frame body may be coupled by a welding method.

Various aspects of the present invention provide for a method of manufacturing a frame unit for a bicycle including a head tube to which a steering shaft is installed, a seat tube to which a seat pipe is installed, a frame configured to integrally connect the head tube and the seat tube and form a body of a bicycle, and left and right stays formed at the rear of the frame, the method including: press-forming a left frame body so that a part of the head tube, a part of the seat tube, a part of the frame, and the left stay are integrally formed; press-forming a right frame body so that a part of the head tube, a part of the seat tube, a part of the frame, and the right stay are integrally formed; coupling the left and right frame bodies; and fitting and assembling a support ring into the head tube.

The support ring may have one end formed to be bent outward so as to form a coupling groove into which an end portion of the head tube is fitted.

The support ring may have the other end formed to be inclined outward so as to form a guide end.

The support ring may be processed in a ring shape by press-forming and rolling a metal plate.

The support ring may have a protrusion which is formed on one end thereof, and a groove which is formed in the other end thereof and into which the protrusion is inserted, and the support ring may be processed in a ring shape by coupling the protrusion and the groove.

The support rings may be coupled to an upper end and a lower end of the head tube, respectively.

The support ring may have the same thickness as the head tube.

The left frame body and the right frame body may be coupled by a welding method.

The left and right frame bodies, which form the head tube, the seat tube, the frame, and the left and right stays, respectively, may be integrally press-formed and coupled, thereby allowing a manufacturing process to be easily performed.

Accordingly, rigidity and durability between the head tube and the frame with respect to an impact load transmitted from a road surface and a fatigue load of the frame unit per se are firmly maintained, thereby preventing damage such as cracks, and securing safety.

In addition, welding work is performed along edges of the left and right frame bodies when the left and right frame bodies are joined, such that welding processes may be automated, working times may be reduced due to the automation, and welding quality and productivity may be improved.

In addition, since the support ring which has the same thickness as the head tube and into which the steering shaft is fitted is installed, the support ring may be instantly joined to the head tube without a separate preheating process when the support ring is installed to the head tube, thereby improving welding quality and reducing time needed during the work process.

In addition, the support ring into which the steering shaft is fitted is produced by a press-forming method, thereby improving productivity.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

A part irrelevant to the description will be omitted to clearly describe the present invention, and the same or similar elements will be designated by the same reference numerals throughout the specification.

The size and thickness of each component illustrated in the drawings are arbitrarily shown for understanding and ease of description, but the present invention is not limited thereto. Thicknesses of several portions and regions are enlarged for clear expressions.

Further, in the following detailed description, names of constituents, which are in the same relationship, are divided into "the first", "the second", and the like, but the present invention is not limited to the order in the following description.

Throughout the specification and the claims, unless explicitly described to the contrary, the word "comprise" and variations such as "comprises" or "comprising" will be understood to imply the inclusion of stated elements but not the exclusion of any other elements.

In addition, "unit", "means", "part", "member", or the like, which is described in the specification, means a unit of a comprehensive configuration that performs at least one function or operation.

Figure 2:
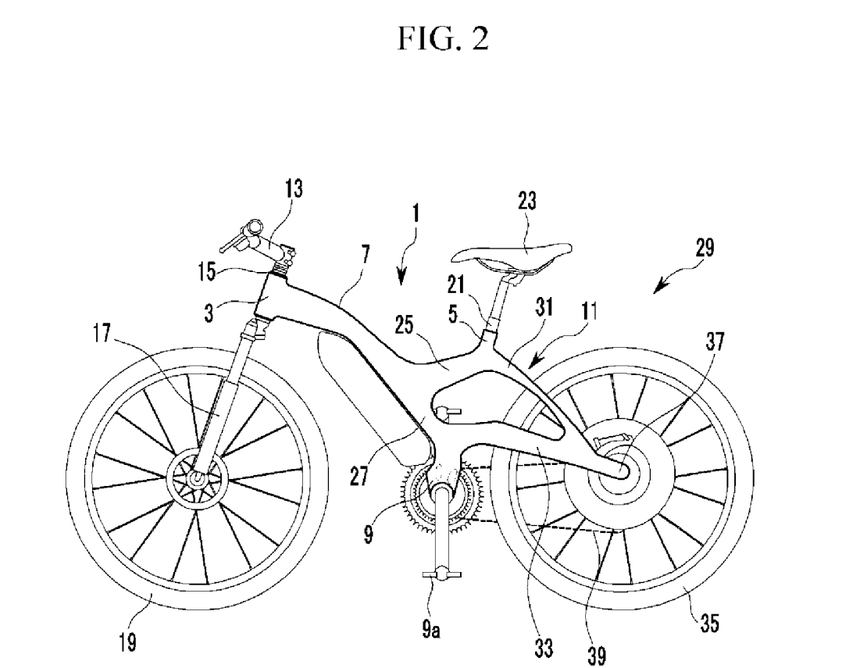
FIG. 2 is a side view of a bicycle to which an exemplary frame unit for a bicycle according to the present invention is applied.
Figure 3:
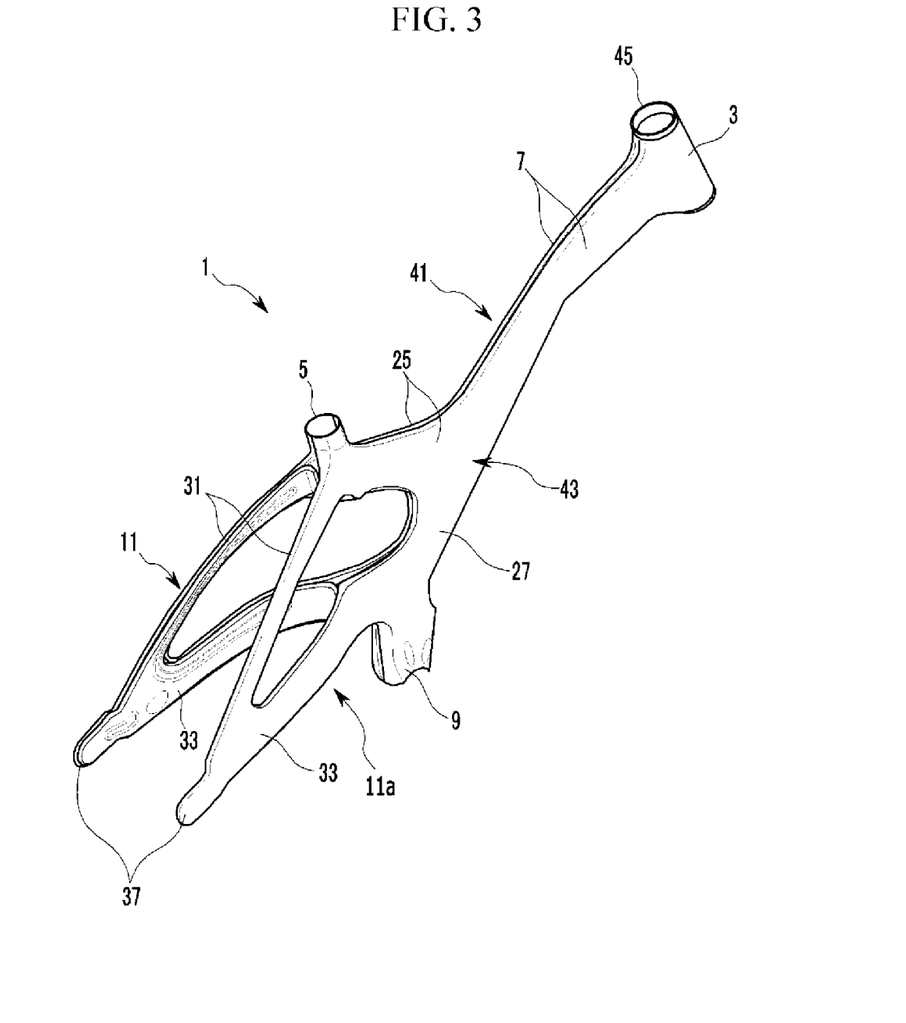
FIG. 3 is a perspective view of an exemplary frame unit for a bicycle according to the present invention.
Figure 4:
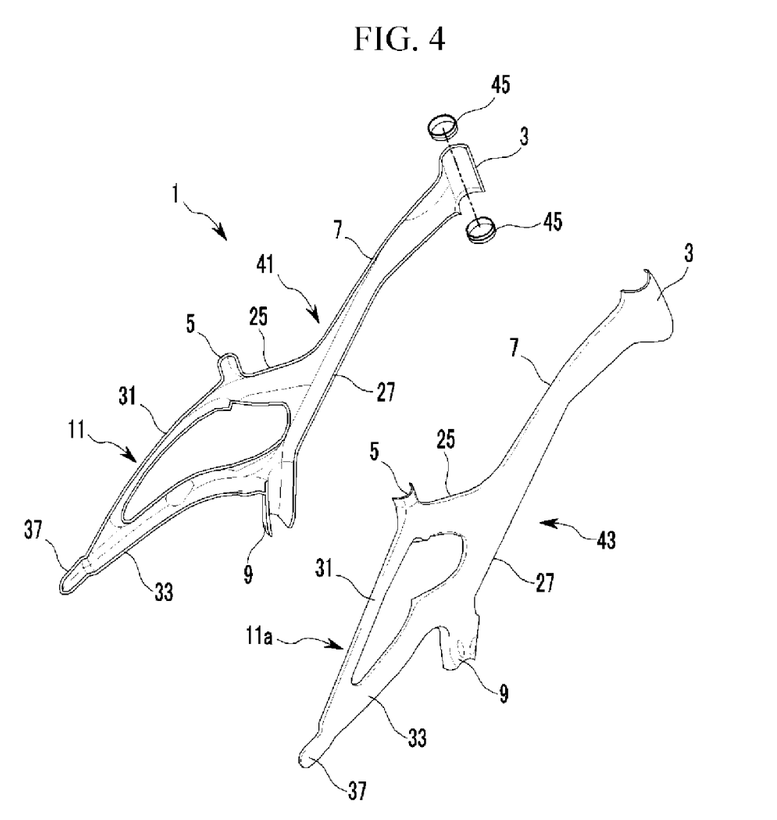
FIG. 4 is an exploded perspective view of an exemplary frame unit for a bicycle according to the present invention.

FIG. 2 is a side view of a bicycle to which a frame unit for a bicycle according to various embodiments of the present invention is applied, FIG. 3 is a perspective view of the frame unit for a bicycle according to various embodiments of the present invention, and FIG. 4 is an exploded perspective view of the frame unit for a bicycle according to various embodiments of the present invention.

Referring to FIGS. 2 to 4, a frame unit 1 for a bicycle according to various embodiments of the present invention includes a head tube 3, a seat tube 5, a frame 7, a pedal assembly 9, and left and right stays 11 and 11a.

A steering shaft 15 to which a handle 13 is mounted is installed to the head tube 3, and a front wheel 19 is installed by a fork 17 configured at a lower side of the steering shaft 15.

A seat 23 is installed to the seat tube 5 by a seat pipe 21.

The frame 7 may include an upper extension frame 25 configured to integrally connect the head tube 3 and the seat tube 5, and a lower extension frame 27 integrally connected to the pedal assembly 9, and forms a body of a bicycle 29. One will appreciate that such integral components may be monolithically formed.

The left and right stays 11 and 11a include an upper stay 31, and a lower stay 33, respectively, and rear ends of both the upper stays 31 and rear ends of both the lower stays 33 are connected to each other so as to form a rotating body fork 37 to which a rear wheel 35 is mounted.

Further, front ends of both the upper stays 31 are connected to the seat tube 5, and front ends of both the lower stays 33 are connected to the pedal assembly 9 configured at a lower side of the seat tube 5.

The pedal assembly 9 may be formed to protrude downward at a lower side between the frame 7 and both the lower stays 33, and a pedal 9a, which is connected to the rear wheel 35 by a chain 39, is installed on the pedal assembly 9.

Here, the head tube 3, the seat tube 5, the frame 7, the pedal assembly 9, and the left and right stays 11 and 11a are formed by a left frame body 41 and a right frame body 43, which are integrally formed. One will appreciate that such integral components may be monolithically formed.

Further, the left and right frame bodies 41 and 43 are joined along edges thereof so as to form an overall configuration of the frame unit 1 for a bicycle.

The left and right frame bodies 41 and 43 are joined to each other by a welding method, and in this case, the welding method may be an arc welding method or the like.

Figure 5:
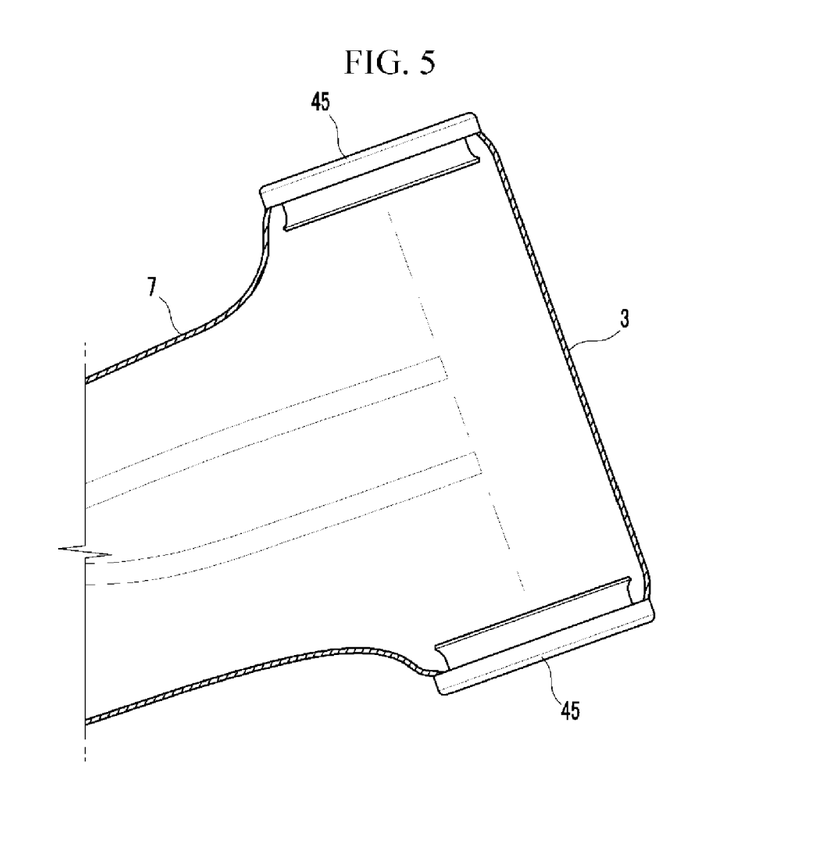
FIG. 5 is a side cross-sectional view illustrating an exemplary configuration of a head tube according to the present invention.
Figure 6:
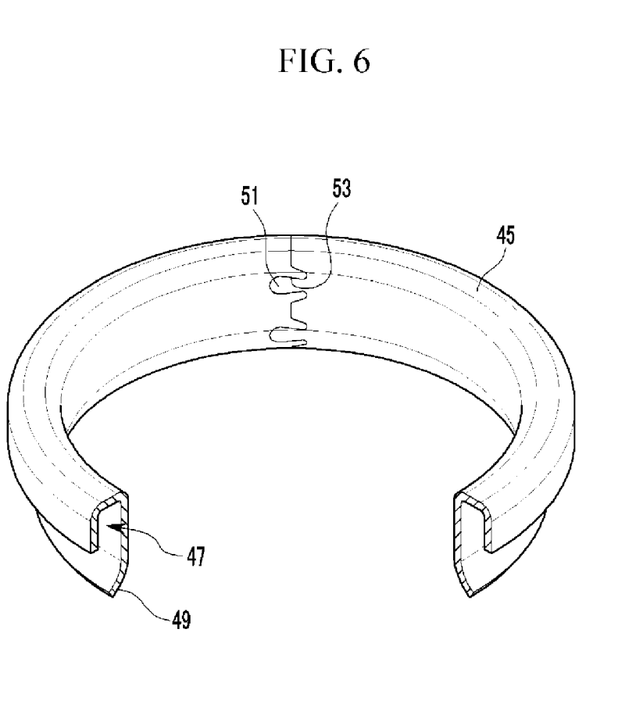
FIG. 6 is a perspective view of an exemplary support ring according to the present invention.

FIG. 5 is a side cross-sectional view illustrating a configuration of the head tube according to various embodiments of the present invention, and FIG. 6 is a perspective view of a support ring according to various embodiments of the present invention.

Referring to FIGS. 5 and 6, as illustrated in the drawings, support rings 45 are installed to the head tube 3, and may be installed to upper and lower sides of the head tube 3, respectively.

The support ring 45 is installed between the steering shaft 15 and the head tube 3, and a bearing or a bearing cup (not illustrated) is mounted on the support ring 45.

Hereinafter, a configuration of the support ring 45 will be described in more detail.

The support ring 45 has one end formed to be bent outward so as to form a coupling groove 47 into which an end portion of the head tube 3 is fitted, and the other end formed to be inclined outward so as to form a guide end 49.

In addition, the coupling groove 47 of the support ring 45 and the head tube 3 are joined by a welding method, and the bearing or the bearing cup may be mounted inside the coupling groove 47, that is, inside the support ring 45.

Here, the guide end 49 serves to guide entry of a tool for removing the bearing or the bearing cup, at the time of hammering work for the bearing or the bearing cup, that is, at the time of maintenance of the bearing or the bearing cup.

The support ring 45 has a thickness that is the same as or similar to a thickness of the head tube 3, and may be manufactured to have a ring shape by step-by-step press-forming process.

According to the frame unit 1 for a bicycle according to various embodiments of the present invention, which has the aforementioned configuration, the head tube 3, the seat tube 5, the frame 7, the pedal assembly 9, and the left and right stays 11 and 11a are integrally formed without a joining portion such that residual stress due to welding heat at a joining portion in the related art may be minimized, and a factor, which causes joint rigidity deterioration due to the residual stress, may be eliminated.

In addition, an occurrence of a safety accident due to cracks and damage which have occurred at the joining portion is reduced, and particularly, rigidity and durability between the head tube 3 and the frame 7 with respect to an impact load transmitted from a road surface and a fatigue load of the frame unit per se are firmly maintained.

Further, the left and right frame bodies 41 and 43, which form the frame unit 1 for a bicycle, are integrally formed, thereby making the entire external appearance of the frame unit 1 for a bicycle be aesthetically attractive.

In addition, weld beads, which occur when the left and right frame bodies 41 and 43 are joined, are not directly exposed to a surface, such that an influence on the entire external appearance design of the frame unit 1 for a bicycle is minimized.

In addition, welding work is performed along edges of the left and right frame bodies 41 and 43 when the left and right frame bodies 41 and 43 are joined, such that welding processes may be automated, working times may be reduced due to the automation, and welding quality and productivity may be improved.

In addition, since the support ring 45 to which the steering shaft 15 is installed is formed to have a thickness that is the same as or similar to a thickness of the head tube 3, the support ring 45 may be instantly joined to the head tube 3 without a separate preheating process when the support ring 45 is installed to the head tube 3, thereby improving welding quality and reducing time needed during the work process.

Hereinafter, a method of manufacturing the frame unit 1 for a bicycle according to various embodiments of the present invention, which has been described above, will be described with reference to FIGS. 3 to 6.

First, the head tube 3, the seat tube 5, the frame 7, the pedal assembly 9, and the left and right stays 11, 11a are integrally trimmed and formed, and thereafter, the left and right frame bodies 41 and 43, which are symmetric to each other, are press-formed, respectively, as illustrated in FIG. 4.

Thereafter, the left and right frame bodies 41 and 43, which are formed by a press, are joined to each other by a welding method along the edges of the left and right frame bodies 41 and 43 such that the frame unit 1 for a bicycle is manufactured, as illustrated in FIG. 3.

Further, as illustrated in FIG. 5, the support rings 45, which are formed to have a ring shape by step-by-step press processing, are fitted into the head tube 3, and thereafter, the support rings 45 and the head tube 3 are joined by a welding method.

In this case, a circumference of the one end of the support ring 45 forms the coupling groove 47 that is formed to be bent outward, the other end of the support ring 45 forms the guide end 49 that is formed to be bent while being inclined and opened outward, the support ring 45 is fitted into each of upper and lower end portions of the head tube 3 through the coupling groove 47, and thereafter, the support rings 45 and the head tube 3 are joined by a welding method.

The support ring 45 may be manufactured by step-by-step press processing.

That is, a flat sheet is formed in a ring shape by a series of press forming processes, and the coupling groove 47 and the guide end 49 are formed by a shape forming process performed between the series of press forming processes.

In a final step, the process of manufacturing the support ring 45 is finished by coupling both side surfaces facing each other using protrusions 51 and grooves 53, as illustrated in FIG. 6. The protrusions 51 and the grooves 53 are formed by processing both the side surfaces of the flat sheet, and coupled to each other in the final step after passing through the series of press forming processes.

In this case, as the sheet that is press-formed, a sheet having a thickness, which is the same as or similar to a thickness of the seat tube 5, is used.

For convenience in explanation and accurate definition in the appended claims, the terms upper or lower, front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A frame unit for a bicycle comprising:
   a left frame body including a part of a head tube, a part of a seat tube, a part of a frame, and a left stay integrally formed; and
   a right frame body including a part of the head tube, a part of the seat tube, a part of the frame, and a right stay integrally formed;
   wherein the left frame body and the right frame body are coupled so as to integrally form the head tube, the seat tube, and the frame, and
   two support rings, one of which is coupled to an upper end and another of which is coupled to a lower end of the head tube, respectively; wherein each of the support rings have one end
   formed to be bent outward so as to form a coupling groove into which an end portion of the head tube is fitted,
   wherein each of the support rings have another end formed to be inclined outward so as to form a guide end,
   wherein each of the support rings are processed in a ring shape by press-forming and rolling a metal plate,
   wherein each of the support rings have a protrusion formed on one end thereof, and a groove formed in another end thereof and into which the protrusion is inserted, and each of the support rings are processed in the ring shape by coupling the protrusion and the groove.

2. The frame unit of claim 1, wherein each of the support rings have a same thickness as the head tube.

3. The frame unit of claim 1, wherein the left frame body and the right frame body are coupled by a weld.

4. A method of manufacturing a frame unit for a bicycle including a head tube configured for supporting a steering shaft, a seat tube configured for mounting a seat pipe, a frame configured to integrally connect the head tube and the seat tube and form a body of the bicycle, and left and right stays formed at a rear of the frame, the method comprising:
   press-forming a left frame body including a part of the head tube, a part of the seat tube, a part of the frame, and the left stay integrally formed together;
   press-forming a right frame body including a part of the head tube, a part of the seat tube, a part of the frame, and the right stay integrally formed together;
   coupling the left and right frame bodies; and
   fitting and assembling two support rings, one of which is coupled to an upper end and another of which is coupled to a lower end of the head tube, respectively; wherein each of the support rings have one end
   formed to be bent outward so as to form a coupling groove into which an end portion of the head tube is fitted,
   wherein each of the support rings have another end formed to be inclined outward so as to form a guide end,
   wherein each of the support rings are processed in a ring shape by press-forming and rolling a metal plate,
   wherein each of the support rings have a protrusion formed on one end thereof, and a groove formed in another end thereof and into which the protrusion is inserted, and each of the support rings are processed in the ring shape by coupling the protrusion and the groove.

5. The method of claim 4, wherein each of the support rings have a same thickness as the head tube.

6. The method of claim 4, wherein the left frame body and the right frame body are coupled by a weld.

\* \* \* \* \*